United States Patent

Krambeck

[15] 3,665,214

[45] May 23, 1972

[54] SHIFT REGISTER USING INTEGRATED NEGATIVE RESISTANCE DEVICES

[72] Inventor: Robert Harold Krambeck, South Plainfield, N.J.

[73] Assignee: Bell Telephone Laboratories, Incorporated, Murray Hill, Berkeley Heights, N.J.

[22] Filed: Nov. 17, 1970

[21] Appl. No.: 90,316

[52] U.S. Cl. ..............................307/221, 307/286, 307/303, 307/324

[51] Int. Cl. ..............................H03k 17/00

[58] Field of Search ..............................307/221, 283, 303, 286

[56] References Cited

UNITED STATES PATENTS 3,070,711 12/1962 Marcus et al. ..............................307/221

*Primary Examiner*—Donald D. Forrer
*Assistant Examiner*—B. P. Davis
*Attorney*—R. J. Guenther and Arthur J. Torsiglieri

[57] ABSTRACT

One example of a shift register comprises a row of triangular n-type regions diffused into a p-type wafer. An n-type back contact region extends along the wafer opposite the row. Alternate n regions are connected in parallel to one clock source with the remaining regions connected to another clock source. A stored information bit is defined by a current filament extending between an n region and a back contact. The triangular configuration permits a bit to be stepped to successive n regions in the row by appropriately synchronized clock pulses.

9 Claims, 7 Drawing Figures

INVENTOR
R. H. KRAMBECK
BY
Robert B. Anderson
ATTORNEY

SHIFT REGISTER USING INTEGRATED NEGATIVE RESISTANCE DEVICES

BACKGROUND OF THE INVENTION

This invention relates to shift registers, and more particularly, to techniques for permitting a shift register to be made from a single semiconductor wafer.

Shift registers are widely used in data processing apparatus, primarily for the temporary storage of data in digital form. They generally comprise a series of storage cells in which digital information or "bits" may be stored and shifted or transferred to a successive storage cell in response to a suitable signal. Each cell may typically include a bistable multivibrator having an "on" or "off" state representative of a stored bit; the bit may be shifted to a successive cell in response to an appropriate clock pulse by causing a multivibrator in the successive cell to assume that same "on" or "off" state.

As circuit developments and packaging techniques in the electronic art have advanced, the need for high speed shift registers in compact integrated form at low cost has become well recognized. An integrated circuit is one formed in a single wafer of semiconductor material, usually silicon. The integration of numerous storage cells, each requiring several transistors and diodes has proven to be complex and costly. For example, conductor "cross-overs" or points at which mutually insulated conductors intersect, create fabrication problems in integrated circuits because they typically require additional dielectric deposition steps.

One promising development is the "magnetic bubble" shift register in which digital bits are described by magnetic field domains that can be stepped to successive locations by appropriate conductors. While these devices are extremely compact, they require special materials such as orthoferrites that are sometimes difficult to reproduce with the desired accuracy. Thus, for some purposes, it would be desirable to retain the dependability and reproducibility presently available with silicon integrated circuit technology.

SUMMARY OF THE INVENTION

Accordingly, it is an object of this invention to provide a compact semiconductor shift register.

It is another object of this invention to reduce the complexity of shift registers of the type made by semiconductor integrated circuit techniques.

These and other objects of the invention are attained in an illustrative embodiment thereof briefly described in the Abstract of the Disclosure. Each pair of triangular n-type regions with the intervening p-type wafer portion constitutes a negative resistance semiconductor diode capable of supporting current along a first path. Each triangular region, the n-type back contact, and the intervening wafer portion constitutes another negative resistance device in which current may flow along a second path in parallel with the first path. As is true of such negative resistance devices, a sufficiently high voltage will produce a tunneling or avalanche breakdown and a current filament, which, in accordance with the invention, constitutes a stored binary information bit.

Alternate n regions are biased at a high voltage with respect to the back contact, with the remaining regions biased at a lower voltage. Information which may be representative of a "1" information bit is introduced by applying a voltage pulse to a first n region of the array. This causes a breakdown with the successive n region (along the first path) which, in turn, triggers a current filament through the wafer to the back contact (along the second path). This current filament constitutes the stored information bit and may conveniently be stepped to successive n regions by appropriate clock pulses superimposed on the applied bias voltage.

The apex of each triangular region extends toward a successive triangular region. In accordance with the invention, the current filament is stepped to the apex of a succeeding triangular region, thus assuring that information stepping is in a predetermined direction. As will be explained later, the current filament is preferentially formed at the apex of a succeeding triangular region because the electric field formed at that location is inherently higher than that at the base of a triangular region.

In the quiescent state, alternate triangular regions are biased positively with respect to the remaining regions. Current filaments between the positively biased triangular regions and the back contact can be maintained indefinitely with low power dissipation, thus providing bit storage. When the bit is stepped to another storage location, it must be transferred to another positive biased triangular region. Thus, each pair of positively and negatively biased triangular regions constitutes a shift register storage cell.

The triangular contact configuration is only one example of how the electric field intensification for preferential avalanche breakdown is obtained for current filament formation. The clock pulses required for stepping the current filament preferably cooperate with identical load resistors in series with each triangular region to give the required voltage changes for proper stepping. It will be appreciated that my shift register is readily amenable to integrated circuit fabrication techniques and offers advantages of simplicity, compactness, and high speed of operation.

These and other objects, features, and advantages of the invention may be better understood from a consideration of the following detailed description of the invention, taken in conjunction with the accompanying drawing.

DRAWING DESCRIPTION

DETAILED DESCRIPTION

Figure 1:
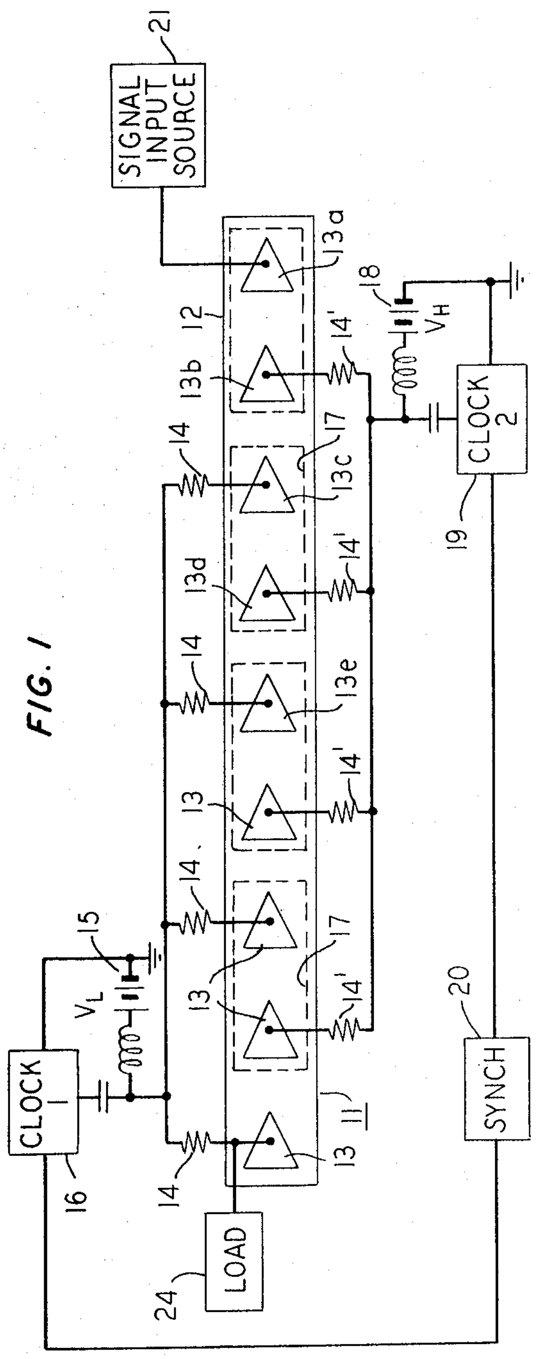
FIG. 1 is a schematic view of an illustrative embodiment of the invention.

Referring now to FIG. 1, there is shown a shift register 11 in accordance with the invention comprising a p-type wafer 12 into which are diffused a row of triangular n-type regions 13. Alternate n-type regions are connected via a resistor 14 to a d-c bias source 15 and a first clock pulse source 16. The remaining n-type regions are connected via resistors 14' to a battery 18 and a second clock source 19. Pulses to be stored in the shift register are transmitted from an input source 21 to an n-type region 13*a*. After appropriate storage and shifting, the pulses are delivered from the device to a load 24. Each pair of oppositely biased adjacent regions 13 comprise a storage cell 17 in which an information bit may be indefinitely stored prior to shifting to successive cells as is usual in conventional "-static" shift registers. A synchronizing device 20 causes positively extending pulses from source 16 to be generated in synchronism with negatively extending pulses from source 19.

Figure 2:
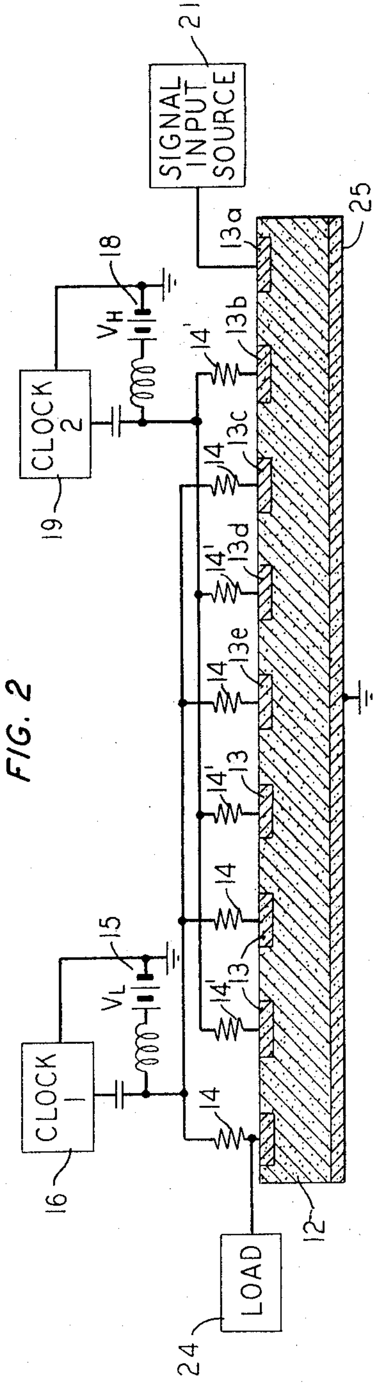
FIG. 2 is an orthogonal sectional view of the embodiment of FIG. 1.

Referring to FIG. 2, an n-type back contact region 25 is included on the wafer opposite to, and coextensive with, the row of diffused regions 13. N-type regions 13 and 25 are typically diffused into the p-type wafer 12 to form p-n rectifying junctions with the wafer. Each successive triangular region 13 forms, with the intervening p-type wafer, an n-p-n negative resistance diode for conducting current along a first path. Each n-type region 13, the back contact region 25, and the intervening p-type wafer constitutes another n-p-n negative resistance diode for conducting current along a second path that is orthogonal to the first path.

Figure 3:
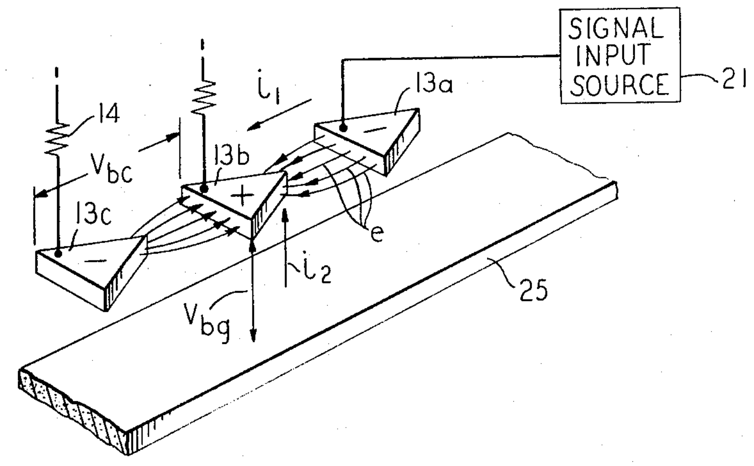
FIG. 3 is a schematic representation of some of the contact regions of the device of FIG. 1 illustrating the preferential formation of current filaments.

The two orthogonal paths are illustrated in the perspective schematic illustration of FIG. 3. Triangular regions 13*a* and 13*b* define a first n-p-n diode that can conduct current $i_1$, while triangular regions 13*b* and the n-type back contact 25 define another n-p-n diode that can conduct current $i_2$ along a second orthogonal path. Note that each triangular region forms an n-p-n device with each other triangular region and with the n-type back contact; for example, triangular region 13*b* forms one diode with region 13*a*, another with region 13*c*, and still another n-p-n diode with the back contact region 25.

Figure 4:
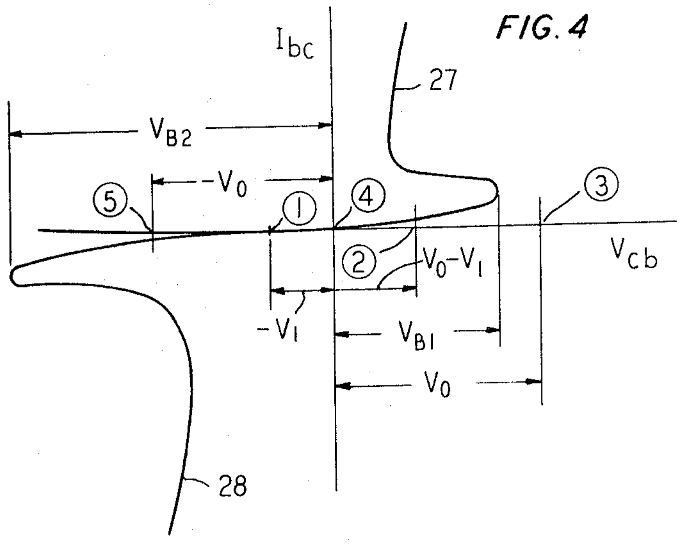
FIG. 4 is a current-voltage characteristic of the negative resistance devices defined between successive triangular regions of the device of FIG. 1.

The fact that n-p-n semiconductor diodes can constitute S-type or "current-controlled" negative resistance devices is known in the art. Basically, it results from the fact that a sufficiently large potential applied to the terminals will cause an avalanche breakdown or a tunneling breakdown at the reverse-biased junction, resulting in the formation of a current filament with a reduced voltage drop across the entire device. FIG. 4 illustrates the well-known S-type curve 27 designating this phenomenon. For purposes of illustration, curve 27 can be taken as a voltage-current plot of the negative resistance device comprising n region 13*c*, the p-type slice and n region 13*b* of FIGS. 1 through 3. Voltage $V_{cb}$ designates the voltage between regions 13*c* and 13*b*. With region 13*b* negative with respect to 13*c*, the voltage increases with increasing current until it reaches a breakdown value $V_{B1}$, at which time an avalanche or tunneling breakdown occurs at the reverse-biased junction of region 13*c* with the wafer 12; and thereafter, the voltage across the device decreases with increasing current to a stable operating point determined by the load line. With region 13*b* positive relative to 13*c*, as shown in FIG. 3, a much higher breakdown voltage $V_{B2}$ is required, as shown by curve portion 28.

The asymmetrical breakdown characteristic results from the triangular configuration of the n regions 13 which assures preferential breakdown in a predetermined direction. Referring to FIG. 3, the rectifying junction formed at the apex of region 13*b* is more amenable to avalanche breakdown (with the polarities shown) than the junctions at any of the triangular bases because the electric field *e* is intensified at the apex. Thus, with the polarity shown, avalanche breakdown will preferentially occur at the apex of triangular region 13*b*, rather than, for example, at the base of triangle 13*b*, which is also reverse biased. Avalanche or tunneling breakdown of course cannot occur at any of the forward-biased junctions.

Breakdown having occurred, current $i_1$ flows between triangular regions 13*a* and 13*b* along a first path as shown in FIG. 3. Region 13*b* forms with back contact 25 another n-p-n negative resistance diode that is triggered to avalanche breakdown by the current $i_1$. It can intuitively be appreciated that if the diode defined by regions 13*b* and 25 is biased near breakdown, current $i_1$, which flows through a common junction, will trigger the breakdown and cause current $i_2$ to flow along a second path.

Figure 5:
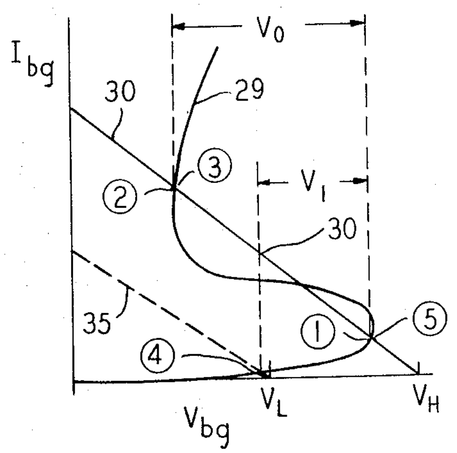
FIG. 5 is a current-voltage characteristic of the device defined between each triangular region and the back contact of the device of FIGS. 1 and 2.

The negative resistance characteristic of each diode defined by a triangular region, the p-type wafer, and the n-type back contacts is designated by curve 29 of FIG. 5. Assuming that the diode is originally biased at point 1 along a load line 30, it will be switched to a point 2 after breakdown. This indicates graphically that a relatively large current $i_2$ is flowing through the diode but that the voltage across the diode has dropped. The voltage $V_{bg}$ designates the voltage between region 13*b* and the ground potential of contact 25.

The foregoing illustrates that an appropriate voltage between successive triangular regions 13 will cause breakdown preferentially at the apex of a triangular region to cause a large electron current to flow from right to left in FIG. 3. This in turn triggers a filament between triangular apex and back contact 25, causing another current filament shown by current $i_2$ in FIG. 3. With appropriate voltages applied, current filaments may successively be triggered between the triangular regions and back contact 25; and the stepping of this current filament is preferentially in the direction of from right to left because of the locations of the triangular apexes. This is the basis of my invention, and the required waveforms for stepping the current filaments, each representative of an information bit such as a "1," will next be examined.

Figure 6:
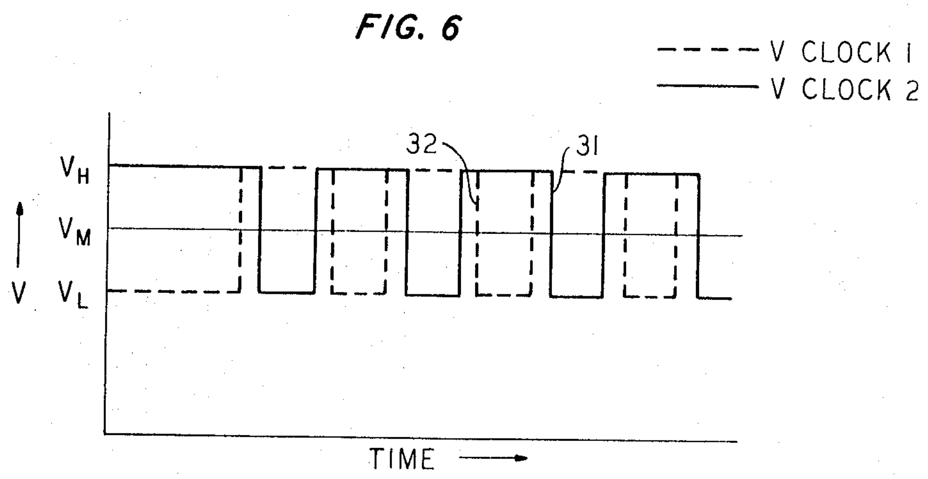
FIG. 6 is a graph of the clock pulse voltages, with respect to time, applied to the device of FIG. 1.

It is clear from the foregoing that a signal input to contact 13*a* will produce a current filament between triangular region 13*b* and back contact 25. With appropriate voltage pulses applied by clock sources 16 and 19 to the triangular regions, this current filament will be stepped to successive storage cells as required in any shift register. FIG. 6 shows the waveform 32 applied by the first clock source 16, while curve 31 shows the waveform applied by the second clock 19. Notice that waveform 31 is superimposed on the bias voltage $V_H$ supplied by battery 18, while waveform 32 is superimposed on the bias voltage $V_L$ supplied by battery 15.

Figure 7:
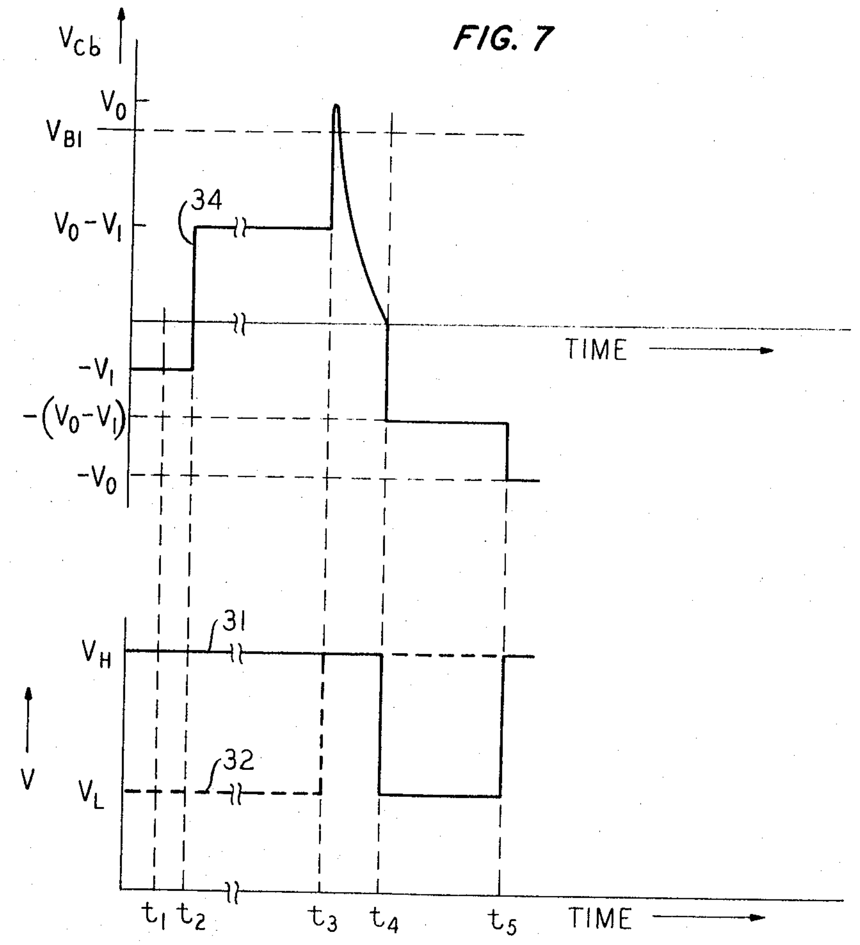
FIG. 7 is a graph of the voltage versus time between successive n regions of the device of FIG. 1 as it relates to part of the voltage graph of FIG. 6.

FIG. 7 shows part of curves 31 and 32 for the purpose of establishing a time sequence of events from which one can better understand the stepping mechanism. The curve 33 of FIG. 7 shows the voltage between regions 13*c* and 13*b* as a function of the same time sequence. The encircled numbers on FIGS. 4 and 5 correspond to the instants of time shown in FIG. 7; for example, encircled 2 of FIGS. 4 and 5 corresponds to time *t2* of FIG. 7.

In the quiescent state, represented by time *t1*, the voltage applied by battery 18 to resistor 14' is $V_H$ as shown by curve 31, while the voltage applied to resistor 14 by battery 15 is $V_L$ as shown by curve 32. Referring to FIG. 5, the bias voltage $V_H$ results in a voltage on triangular region 13*b* determined by the intersection of load line 30 with curve 29 designated by the point 1. The lower bias voltage applied to triangular region 13*c* results in a voltage difference $V_1$ between regions *b* and *c* that is illustrated on curve 34 of FIG. 7 and on FIGS. 4 and 5.

Assume that at time *t2* an input pulse is delivered from the source 21 to input contact 13*a*. For the reasons mentioned previously, this creates a current filament and a breakdown of the junction at the apex of triangular region 13*b*, causing the voltage between region 13*b* and the ground contact to drop. The negative resistance diode between region 13b and ground contact region 25 is switched to an "on" state designated by the intersection of load line 30 and curve 29 at point 2 of FIG. 5. The consequent change in voltage of region 13*b* is designated $V_0$ in FIG. 5 and the difference in potential $V_{cb}$ between regions 13*b* and 13*c* is $V_0 - V_1$ as shown in FIGS. 4 and 7. At this juncture, filamentary current $i_2$ is flowing to contact 13*b* as shown in FIG. 3 and an information bit is maintained which may be stored indefinitely. The break in the FIG. 7 curves indicate that the conditions at time *t2* may obtain for an indefinite time.

Assume that it is next determined to step the stored bit by activating the clock sources 16 and 19. At time *t3* clock 16 operates to raise the voltage of resistor 14 to equal that of resistor 14' as represented by curve 32, which increases to equal the voltage of curve 31. With no difference in externally applied voltage, the voltage $V_{cb}$ between 13*b* and 13*c* must equal $V_0$ shown in FIG. 5. As shown in FIG. 4, this large increase exceeds the breakdown voltage $V_{B1}$ and a current filament is formed at the apex of triangular region 13*c*. This causes the diode between triangular region 13*c* and ground contact 25 to move to the high current low voltage "on" state and the voltage $V_{cb}$ decays to zero. At time *t4*, the voltage applied to resistor 14' falls as shown by curve 31, causing the voltage on triangular region 13*b* to be controlled by load line 35 of FIG. 5. The diode between the ground contact and region 13*b* is thereby switched to the "off" state and the filament represented by $i_2$ of FIG. 3 is quenched. Thus, the filamentary current has been stepped from triangular region 13*b* to region 13*c*.

At time *t5* the voltage on resistor 14' returns to $V_H$ as shown by curve 31 of FIG. 7 causing the difference in voltage $V_{cb}$ to increase $-V_0$ as shown by curve 34. Since $-V_0$ does not exceed $-V_{B2}$, as shown in FIG. 4, there is no new breakdown between regions 13*b* and 13*c*. Thus, though the clock pulses illustrated in FIG. 6 are symmetrical, the filament does not oscillate between adjacent triangular regions, but rather is stepped to successive regions because of their asymmetrical configuration.

On duplicating this analysis, one can see that the stored pulse or filament is successively stepped from right to left as required for the desired shift register operation. During each cycle of clock pulses, the filament is stepped by one storage cell, and if the clock pulses are terminated, it is stored by the triangular region that is biased at the higher quiescent voltage $V_H$. When the filament reaches the final triangular region of the row, it is, of course, detected and transmitted to the load as a "1" digit. A "0" digit is typically represented by the absence of stored energy; i.e., the absence of a current filament.

The construction of the clock sources 16 and 19 and the appropriate synchronization between them to generate the synchronized pulsed waveforms shown in FIG. 6 is a matter within the ordinary skill of a worker in the art. The sources 15, 16, 18, and 19 may be designed to give a $V_H$ of 20 volts and a $V_L$ of 15 volts. It is recommended that the time interval $\Delta t$ between times *t*3 and *t*4 of FIG. 7 be less than 1 microsecond, and on the order of 0.5 microsecond to avoid stepping the filament through more than one storage cell during one cycle of clock source output. That is, it is preferred that each cycle of the clock sources step the filament through only one storage cell. The positively extending pulses of curve 34 may have a duration of 2 microseconds and a separation of 1 microsecond, while the negatively extending pulses of curve 31 may have a duration of 1 microsecond and a separation of 2 microseconds. With proper synchronization this will give a time interval $\Delta t$ of 0.5 microseconds.

The wafer 12 is preferably silicon with the n-type regions being diffused into the wafer in a conventional manner. The distance between the apex of one triangular region and the base of the successive region may be on the order of 15 microns, and the separation between the row of triangular regions and the back contact 25 may be 50 microns. As is known in the silicon negative resistance diode art, a wide range of doping may be used, and in fact, the wafer may be of intrinsic conductivity; but in any case, the conductivity differences must be sufficiently great to provide rectifying junctions suitable for avalanche or tunneling breakdown. The capacitors and inductors shown connected between the clock sources and the d-c sources are for the purpose of separating the d-c and r-f current paths and are not intended to perform energy storage functions.

It is clear that the shift register shown is amenable to integrated circuit fabrication techniques and can be made relatively easily to be compact and reliable. It should be feasible to construct shift registers with an area of less than 10 square mils per storage cell. The switching time may be of the order of $10^{-9}$ seconds which indicates that operation at 100 megahertz or more is possible.

Low power considerations require that the triangular apexes be defined as sharply as possible; but this consideration can practically be met by known photolighographic techniques. Improvements in electric field intensification may be made by using configurations other than the triangular ones shown. Basically, the requirement of directionality is that projections extend from one side of each n-type region to give preferential field intensification. There is, however, no need for a projection from the first region of the array; i.e., region 13*a* of FIG. 1 may be of any shape.

Of course, p-n-p conductivity devices may alternatively be used, as well as Schottky barrier contacts, for defining the negative resistance diode portions. The electrode designated the back contact may be included on the same side of the semiconductor wafer as the row of triangular regions. Various other embodiments and modifications may be made by those skilled in the art without departing from the spirit and scope of the invention.

What is claimed is:

1. A shift register comprising:
a wafer of a first conductivity type;
a row of spaced first regions of a second conductivity type arranged along the wafer;
said regions being spaced apart and having a projection on one side thereof;
a second region of said second conductivity type arranged along the wafer and being substantially coextensive with the row;
adjacent spaced first regions and the intervening wafer constituting a first negative resistance diode;
each first region, the second region and the intervening wafer constituting a second negative resistance diode;
each first and second negative resistance diode having a stable high voltage operating point and a stable low voltage operating point;
each first negative resistance diode having a breakdown voltage $V_{B1}$;
a voltage difference between the high voltage operating point and the low voltage operating point of each second diode being greater than the breakdown voltage $V_{B1}$ of each first diode;
means for exciting a current filament in one first negative resistance diode;
and means for stepping the current filament to successive first negative resistance diodes comprising means for producing voltage pulses between successive first regions.

2. The shift register of claim 1 further comprising:
a substantially identical resistor connected in series between each first region and the voltage pulse producing means, thereby to give a substantially identical load line to each second diode and substantially identical high voltage operating points and low voltage operating points.

3. The shift register of claim 2 wherein:
the voltage pulse producing means comprises a first clock source for applying a first train of pulses to alternate resistors and a second clock source for applying a second train of pulses to the remaining resistors;
the first and second pulse trains being synchronized.

4. The shift register of claim 3 wherein:
the first train is superimposed on a steady voltage component $V_H$ and is negatively extending;
the second train is superimposed on a steady voltage component $V_L$ and is positively extending;
the sum of the component $V_L$ and the positively extending component pulses of the second pulse train are substantially equal to $V_H$.

5. The shift register of claim 4 wherein:
the pulses of the second train are of longer duration and shorter separation than the pulses of the first train, but of the same frequency as the pulses of the first train.

6. The shift register of claim 5 wherein:
the means for exciting a current filament in said one first region comprises a third region of said second conductivity type;
said third region comprises means for inducing an avalanche breakdown of a junction of the one first region with the wafer in response to the signal.

7. The shift register of claim 6 wherein:
said first and third regions are arranged along a first surface of the wafer;
and the second region is arranged along a second surface of the wafer opposite the first surface.

8. The shift register of claim 7 wherein:
the first regions are each of triangular configuration having an apex that constitutes said projection.

9. The shift register of claim 8 wherein:
the wafer is of silicon;
and the first, second and third regions are diffused regions.

* * * * *